United States Patent [19]

Petersen-Hoj

[11] 4,405,400
[45] Sep. 20, 1983

[54] LAMINATED MATERIAL

[75] Inventor: Peter Petersen-Høj, Espergärde, Denmark

[73] Assignee: Tetra Pak Developpement SA, Switzerland

[21] Appl. No.: 409,974

[22] Filed: Aug. 20, 1982

Related U.S. Application Data

[62] Division of Ser. No. 173,649, Jul. 30, 1980, Pat. No. 4,373,002.

[30] Foreign Application Priority Data

Jul. 30, 1979 [CH] Switzerland .................. 7027/79

[51] Int. Cl.³ .................. B29C 19/00; B28B 3/20; B32B 7/02
[52] U.S. Cl. .................. 156/244.11; 156/244.24; 264/45.9; 264/176 R; 428/213; 428/480

[58] Field of Search .................. 156/244.11, 244.24; 264/176 R, 45.9; 428/213, 480, 214, 347, 349, 355

[56] References Cited

U.S. PATENT DOCUMENTS

| | | | |
|---|---|---|---|
| 4,011,358 | 3/1977 | Roelofs | 428/480 X |
| 4,091,150 | 5/1978 | Roelofs | 428/480 X |
| 4,097,282 | 6/1978 | Noonan et al. | 428/480 X |

Primary Examiner—Thomas J. Herbert, Jr.
Attorney, Agent, or Firm—Burns, Doane, Swecker & Mathis

[57] ABSTRACT

The invention relates to a laminated material, the main layer of which consists of a molecular-oriented polyester material which has very good tensile strength characteristics and a sealing layer joined to the main layer of a modified polyester material of the type which is marketed under the trade name PETG and which retains its sealing characteristics in spite of the laminated material being subjected to a joint molecular-oriented stretching.

3 Claims, 5 Drawing Figures

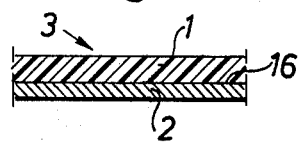
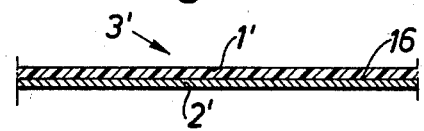
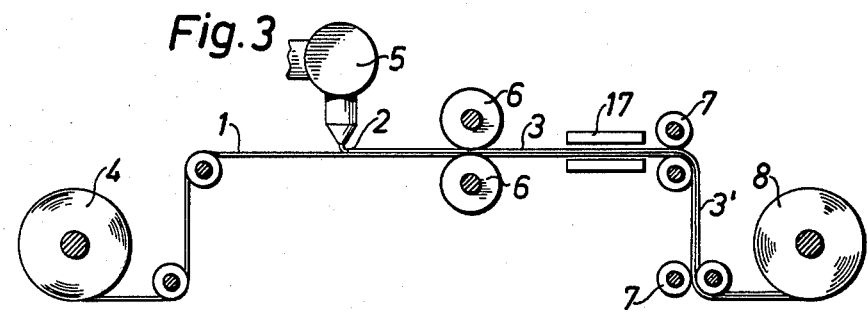
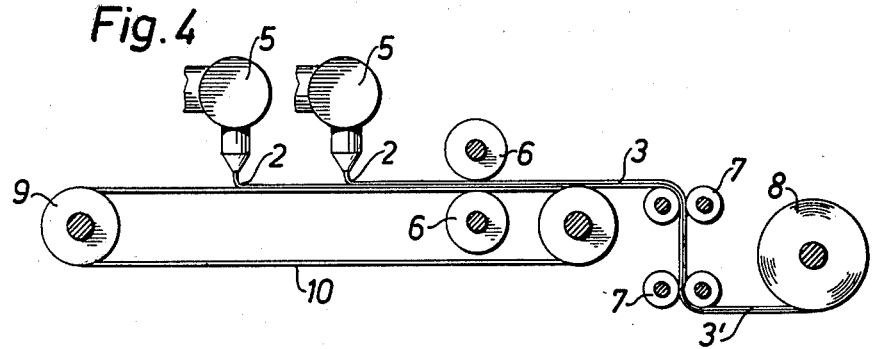
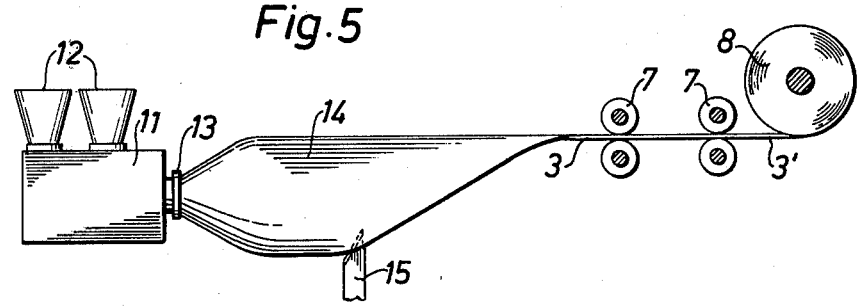

LAMINATED MATERIAL

This application is a division of application Ser. No. 173,649, filed July 30, 1980 U.S. Pat. No. 4,373,002.

BACKGROUND AND SUMMARY OF THE PRESENT INVENTION

The present invention relates to a heat-sealable laminated material and to a method for the manufacture of such a laminate.

It is known that in the technique of packaging molecular-oriented polyester films or packages molecular-oriented polyester material are used, especially in cases where the packing material is expected to withstand great tensile stresses without being changed in shape. Polyester material has been used, for example, in connection with plastic bottles for pressurized contents such as e.g. refreshing beverages. The bottles are blown from a polyester material in such a manner that the inflation is carried out at a temperature which is such that the walls in the plastic bottle formed are molecular-oriented.

This molecular orientation substantially improves the tensile characteristics of the plastic material in spite of the package wall in the bottle being thinned out in connection with the blowing operation. The plastic bottles for refreshing beverages are generally provided with a screw cap or some other closing device, which is not directly sealed to the plastic material by surface fusion.

On stretching the polyester material, beside a thinning of the material, a conversion of the molecular structure takes place, so that the material becomes mainly crystalline. A polyester material which has been molecular-oriented in such a manner by stretching, is very difficult to heat-seal, and the heat-sealing characteristics become worse the more the material is stretched. In other words, the more the crystalline structure predominates in the material.

For the abovementioned reasons, thin film material of orientation-stretched polyester material has not found any appreciable application within the technique of packaging, since the material cannot be heat-sealed. In view of the excellent tensile strength of the material it would be desirable, however, to use orientation-stretched polyester material in many fields, provided it could be made heat-sealable. Experiments have been carried out using glue or so-called hot melt which can be sealed at a relatively low temperature instead of heat-sealing the material. Experiments have also been carried out coating orientation-stretched polyester material either before or after the orientation-stretching, with a plastic material of a relatively low melting point, e.g. polythene. However, it has been found that there are great difficulties in achieving good adhesion between the polythene layer and the polyester layer, and consequently the method has not found much application. In recent years, however, certain modified polyester materials have come on the market, so-called cyclohexane-modified polyesters or PETG, which polyester material may be subjected to a stretching at which ordinary polyester material is molecular-oriented, while the modified polyester material is not altered in its molecular structure or does not become crystalline to any great extent. The modification of the polyester material may be pushed to different lengths, which means that within certain limits the tendency towards crystallization can be controlled. The fact that the material fails to be molecular-oriented and to be crystallized means of course that the cyclohexane-modified polyester material to some extent is only reduced during the stretching operation but is not given the greatly improved tensile strength characteristics which on orientation-stretching are imparted to an ordinary polyester material. On the other hand, however, the heat-sealing characteristics of the stretched modified polyester material are maintained. The heat sealing characteristics are of decisive importance for the manufacture of packing containers from webs or sheets of packing material, which must be heat-sealed in order to create the closed space which is to hold the contents.

Neither the ordinary polyester material made very strong by molecular orientation nor the modified sealable polyester material is suitable by itself to be used as packing material, since the one material is strong but not sealable and the other material is sealable but not strong. They can advantageously be included jointly in the packing laminate, however, since the two materials, which are both polyester material, can be joined together very easily by surface fusion, either by extrusion coating of the one material onto the other, by separate extrusion of the two materials or by direct combination or else by so-called co-extrusion, where the two materials are extruded simultaneously, and in one layer, through one extruder die.

The disadvantages in connection with the application of orientation-stretched polyester material mentioned earlier can thus be overcome by the present invention which relates to a laminated material comprising at least one layer of a monoaxially or biaxially orientation-stretched polyester material of predominantly crystalline molecular structure, and at least one layer of a cyclohexanemodified polyester material, so-called PETG material, of predominantly amorphous molecular structure,. The layer of polyester material of predominantly amorphous molecular structure is substantially thinner than the layer of crystalline molecular structure.

The invention relates moreover to a method for the manufacture of such a laminate. The method is characterized in that two or more layers of polyester material are joined together by lamination or extrusion, e.g. co-extrusion, the one polyester material being modified and being of the type which can be subjected to a stretching treatment at a temperature below 100° C. without the amorphous molecular structure being wholly lost, e.g. a polyester material of the type which is marketed under the designation PETG. The second layer is constituted of polyester material whose molecular structure becomes crystalline when the material is subjected to stretching at a temperature below 100° C. The layers so combined are subjected to a joint stretching operation at a temperature below 100° C.

BRIEF DESCRIPTION OF THE DRAWINGS

In the following the invention will be described with reference to the enclosed schematic drawing wherein like members bear like reference numerals and wherein:

FIG. 1 is a cross-section of a strongly enlarged laminated material prior to the material having been subjected to an orienting stretching, FIG. 2 is a cross-section of the same laminate after it has been subjected to an orientating-stretching, and FIGS. 3, 4 and 5 are schematic views of arrangements for the manufacture of a laminated material in accordance with the invention.

DETAILED DESCRIPTION OF THE PREFERRED EMBODIMENT

In FIG. 1 is shown a strongly enlarged cross-section of a laminated material 3 before the same has been subjected to an orientating-stretching. The laminate 3 consists on the one hand of a layer 1 of an ordinary polyester material, on the other hand of a layer 2 of a cyclohexane-modified polyester material of the type which is marketed under the designation PETG. The modified material properties differ from those of ordinary polyester material in that it can be stretched at a temperature below 100° C. without the molecular structure becoming wholly crystalline.

The polyester layers 1 and 2 included in the laminate 3 both have an amorphous molecular structure before stretching and they are firmly anchored in one another through surface fusion between the materials in the contact zone 16. After stretching of the laminate in accordance with FIG. 1, which stretching may be either stretching in one direction, so-called monoaxial stretching, or a stretching in two directions perpendicular to one another, so-called biaxial stretching, where the degree of stretching may be varied between 3 and 20 times measured in the direction of stretching, one layer is oriented and given crystalline structure, while the other layer substantially maintains its amorphous structure.

As mentioned earlier, the molecular-orienting stretching must be carried out within a certain temperature range characteristic for the material. A molecular orientation and consequent improvement of the strenth characteristics cannot be obtained if the material is too warm and plastic. A stretching is impossible to perform without the material breaking, if the same is too cold. In the manufacture of the laminate 3 in accordance with the invention it is assumed that the molecular-orienting stretching is carried out while the laminate 3 and the layers 1, 2 included therein are of such a temperature that they are within the limits required for the realization of molecular orientation of layer 1, and the temperature is above the limit at which the layer is molecular-oriented to a greater degree.

With reference to FIG. 2, a laminate 3' after the stretching operation, and the layers 1' and 2' included therein has been thinned but they are still firmly anchored in each other along the joint contact zone 16. The laminate layer 1' has been given a strong molecular orientation and consequent crystalline molecular structure through stretching and has obtained substantially improved tensile strength characteristics, while the layer 2' in principle has only been stretched and thinned without having been molecular-oriented and structurally changed, which means that the layer is still of a substantially amorphous molecular structure and is thus sealable by means of heat.

The laminate in accordance with FIG. 2 may thus be used in the form of a sheet or web for the manufacture of closed packaging containers where great strength is required of the packing material, e.g. packages containing liquid, powder or granulate which give off a gas during storage and thus create an internal pressure in the package.

FIGS. 3, 4 and 5 show schematically different arrangements for the manufacture of a laminate in accordance with FIG. 2 and in FIG. 3 it has been assumed that one of the laminate layers 1 or 2, e.g. layer 1, has been prefabricated and exists as a web wound up on a magazine roll 4. The web 1 of polyester material is rolled off the magazine roll 4 and is coated with a layer 2 of a cyclohexane-modified polyester material of the type mentioned above by means of an extruder 5 from which the melted polyester material is extruded with the help of co-operating compression and cooling rollers 6 so that a surface fusion between layers 1 and 2 is obtained. The material 3 thus formed may be heated if required on one or on both sides by means of a heating device 17, e.g. a radiating heater, to be conducted thereafter between two pairs of drawing rollers 7. The two pairs of rollers 7 are driven at different speeds, so that the material 3' between the two pairs of rollers is subjected to a stretching which gives the desired molecular orientation of the layer 1. After the stretching operation the laminate 3' is wound up on a magazine roll 8.

In a second method for the manufacture of the laminate according to FIG. 2 with reference to FIG. 4, the two polyester layers 1 and 2 are extruded as films by extruders 5 onto an endless belt 10 which runs between rollers 9. The belt 10 which may be a surface-treated steel belt, tends to adhere only slightly to the material layer 1, so that the layer 1 can readily be drawn off the belt 10. The two extruded polyester layers 1 and 2 placed on top of one another are pressed together by means of co-operating compression and cooling rollers 6. The laminate 3 is drawn off the belt 10 and is introduced between two pairs of co-operating drawing rollers 7, which in the manner described earlier are driven at different speeds so that the material between the pairs of rollers is subjected to an axial stretching operation. The stretched material 3' is wound up on a magazine roll 8.

In a further method for the manufacture of a laminate in accordance with the invention with reference to FIG. 5, an extruder 11 is provided through which two or more materials can be extruded simultaneously by so-called co-extrusion. The polyester materials included in the laminate are introduced into extruder 11 through the delivery hoppers 12, whereupon the two materials, each for itself, are melted in the extruder to be combined in an outlet die 13 of the extruder which in this case is assumed to be of annular shape. Through the outlet die 13 a seamless tube 14 is thus extruded consisting of the two polyester material layers 1 and 2 which have been combined by intimate surface fusion in the contact zone 16. The tube 14 is subjected to axial as well as radial stretching, on the one hand by being wound up on a cooling drum, not shown here, on the other hand by inflation and drawing in axial direction, whereby the laminate layer 1 is molecular-oriented whilst the laminate layer 2 is not given any molecular orientation, since the drawing is carried out at such a high temperature that the laminate layer 2 is not altered in its molecular structure. Subsequently, the tube 14 may be slit open with a knife 15 and spread out to a flat web and wound up on a magazine roll 8. If the stretching operation has been carried out in its entirety while the material is in tubular form, the flattened web may be introduced in the manner as described above between co-operating pairs of driven drawing rollers 7, the front pair of rollers seen in the direction of drawing being at a higher speed than the rear one, so that the material between the pairs of rollers is subjected to a controlled stretching. It is a prerequisite that the temperature of the material is as intended, that is to say, the temperature of the laminate 3 shall be such that it lies within the temperature limits for orientation stretching of the laminate layer 1 but higher than the limit for orientation stretching of the laminate layer 2. The orientation-stretched laminate 3' is then wound up in the manner as described above on a magazine roll 8 and is ready for use as a packing material.

The laminate and the method in accordance with the invention provide a solution to a problem which has existed for a long time, and the result will be a very cheap packing material which at the same time combines great mechanical strength with heat-sealability. The laminate described above can, of course, be combined with other types of material layers, e.g. barrier material which provides better gas impermeability (for example polyvinylidene chloride or aluminium foil).

The principles, preferred embodiments and mode of operation of the present invention have been described in the foregoing specification. However, the invention which is intended to be protected is not to be construed as limited to the particular embodiments disclosed. The embodiments are to be regarded as illustrative rather than restrictive. Variations and changes may be made by others without departing from the spirit of the present invention. Accordingly, it is expressly intended that all such variations and changes which fall within the spirit and scope of the present invention as defined in the appended claims be embraced thereby.

What is claimed is:

1. A method for the manufacture of a laminated material, comprising the steps of joining together at least two layers of polyester material, a first layer being modified polyester material and being of the type which can be subjected to a stretching treatment at a temperature below 100° C. without amorphous molecular structure being wholly lost, a second layer being polyester material whose molecular structure becomes crystalline when the material is subjected to a stretching at a temperature below 100° C., and subjecting the layers so combined to a joint stretching operation at a temperature below 100° C.

2. The method according to claim 1, wherein the at least two layers are joined together by laminating the layers together.

3. The method according to claim 1, wherein the at least two layers are joined together by co-extruding the layers.

* * * * *